United States Patent
Shin et al.

(10) Patent No.: US 10,777,801 B2
(45) Date of Patent: Sep. 15, 2020

(54) COMPLEX SEPARATOR FOR ELECTROCHEMICAL ELEMENT, COMPRISING BONDING LAYER, AND ELECTROCHEMICAL ELEMENT COMPRISING SAME

(71) Applicant: LG CHEM, LTD., Seoul (KR)

(72) Inventors: Jin-Young Shin, Daejeon (KR); Young-Deok Kim, Daejeon (KR); Su-Jin Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 246 days.

(21) Appl. No.: 15/569,666

(22) PCT Filed: Aug. 25, 2016

(86) PCT No.: PCT/KR2016/009464
§ 371 (c)(1),
(2) Date: Oct. 26, 2017

(87) PCT Pub. No.: WO2017/034353
PCT Pub. Date: Mar. 2, 2017

(65) Prior Publication Data
US 2018/0123106 A1 May 3, 2018

(30) Foreign Application Priority Data
Aug. 25, 2015 (KR) .................. 10-2015-0119620

(51) Int. Cl.
*H01M 2/16* (2006.01)
*H01M 2/14* (2006.01)

(52) U.S. Cl.
CPC ......... *H01M 2/1686* (2013.01); *H01M 2/145* (2013.01); *H01M 2/166* (2013.01); *H01M 2/168* (2013.01); *H01M 2/1653* (2013.01)

(58) Field of Classification Search
CPC ............. H01M 2/16; H01M 2/14; H01M 2/02
See application file for complete search history.

(56) References Cited

U.S. PATENT DOCUMENTS

2008/0292968 A1  11/2008  Lee et al.
2012/0270036 A1  10/2012  Kiuchi et al.
(Continued)

FOREIGN PATENT DOCUMENTS

CN   102746800 A   10/2012
CN   103947020 A   7/2014
(Continued)

OTHER PUBLICATIONS

International Search Report for PCT/KR2016/009464 (PCT/ISA/210) dated Dec. 27, 2016.
(Continued)

*Primary Examiner* — Kenneth J Douyette
(74) *Attorney, Agent, or Firm* — Birch, Stewart, Kolasch & Birch, LLP

(57) ABSTRACT

The present disclosure relates to a composite separator for an electrochemical element and the electrochemical element including the same. More specifically, the present disclosure relates to a separator with excellent durability and improved formation of a bonding layer of a thin film and improved bonding force with an electrode, and a method for manufacturing the same. Further, the present disclosure pertains to an electrochemical element comprising the aforementioned separator.

11 Claims, 1 Drawing Sheet

(56) References Cited

U.S. PATENT DOCUMENTS

| | | |
|---|---|---|
| 2012/0315541 A1 | 12/2012 | Sasaki et al. |
| 2013/0089770 A1* | 4/2013 | Nishikawa ............ H01M 2/162 |
| | | 429/145 |
| 2013/0316219 A1 | 11/2013 | Ha et al. |
| 2014/0248526 A1 | 9/2014 | Wöhrle et al. |
| 2014/0370358 A1 | 12/2014 | Hong et al. |
| 2015/0140403 A1 | 5/2015 | Moon et al. |
| 2015/0236323 A1* | 8/2015 | Honda ................ H01M 2/1653 |
| | | 429/144 |
| 2015/0333308 A1 | 11/2015 | Toyoda et al. |
| 2015/0372277 A1 | 12/2015 | Honda |

FOREIGN PATENT DOCUMENTS

| | | |
|---|---|---|
| CN | 104022243 A | 9/2014 |
| CN | 104600230 A | 5/2015 |
| JP | 2014-149935 A | 8/2014 |
| KR | 10-2006-0021221 A | 3/2006 |
| KR | 10-2006-0116043 A | 11/2006 |
| KR | 10-0727247 B1 | 6/2007 |
| KR | 10-2013-0066746 A | 6/2013 |
| KR | 10-2013-0075672 A | 7/2013 |
| KR | 10-2014-0026009 A | 3/2014 |
| KR | 10-2015-0002629 A | 1/2015 |
| KR | 10-2015-0057481 A | 5/2015 |
| WO | WO 2011/122297 A1 | 10/2011 |
| WO | WO-2013-151144 A1 * | 10/2013 .......... H01M 2/1686 |
| WO | WO 2014/147888 A1 | 9/2014 |

OTHER PUBLICATIONS

Chinese Office Action and Search Report, dated May 18, 2020, for Chinese Application No. 201680030037.6, along with an English translation.

* cited by examiner

COMPLEX SEPARATOR FOR ELECTROCHEMICAL ELEMENT, COMPRISING BONDING LAYER, AND ELECTROCHEMICAL ELEMENT COMPRISING SAME

TECHNICAL FIELD

The present application claims priority to Korean Patent Application Laid-open No. 10-2015-0119620 filed on Aug. 25, 2015 in the Republic of Korea, the disclosure of which is incorporated herein by reference. The present disclosure relates to a composite separator for an electrochemical element and an electrochemical element comprising the same. More specifically, the present disclosure relates to a separator with excellent durability and improved formation of a bonding layer of a thin film and improved bonding force with an electrode, and a method for manufacturing the same. Further, the present disclosure relates to an electrochemical element comprising said separator.

BACKGROUND ART

A secondary battery is an energy storage body with high energy density, that basically consists of a positive electrode/a negative electrode/a separator/electrolyte, that is capable of charging and discharging as chemical energy and electrical energy are reversibly converted, and that is widely used in small size electronic equipment such as mobile phones and notebooks, etc. Recently, its application is rapidly expanding to hybrid electric vehicles (HEV), plug-in EVs, e-bikes and energy storage systems (EES), in order to respond to environmental problems, high oil prices, energy efficiency and storage demands.

In manufacturing and using such a secondary battery, securing safety of the secondary battery is an important task to be resolved. Especially, a separator, that is generally used in electrochemical elements, exhibit extreme thermal shrinkage behavior in situations of high temperature and the like due to its material characteristics and characteristics of manufacturing process, thereby leading to safety problems of internal short-circuit. Recently, an organic-inorganic composite porous separator was proposed (see Korean Patent Application No. 10-2004-0070096), where a porous inorganic coating layer is formed by coating a mixture of inorganic particles and binder resin on a porous material for a secondary battery separator, in order to secure safety of the secondary battery. However, there exists a problem that when stacking an electrode and a separator to form an electrode assembly, due to insufficient interlayer bonding force, there is a high risk of the electrode and the separator being separated from each other, in which case inorganic particles being de-intercalated in the separating process may act as a local defect in an element.

In order to resolve this problem, Korean Patent Application Laid-open No. 10-2006-0116043 discloses a method comprising adding ethanol to a solution, in which a good solvent such as acetone has been dissolved, and then applying the solution on top of a separator, and drying it, so that a porous bonding layer can be obtained by the phase separation effect. The porous bonding layer obtained in this method has advantages of excellent infiltration and low resistance during battery operation, but due to swelling upon injection in the manufacturing process of a battery, coherence with the separator, that is, the mechanical strength decreases, and low cycling characteristics and interlayer mixing with the porous inorganic coating layer occur, blocking the pores formed in the porous inorganic coating layer, thus leading to a problem of deterioration of air permeability of the separator.

DISCLOSURE

Technical Problem

A purpose of the present disclosure is to provide a composite separator for an electrochemical element, capable of preventing deterioration of durability that may be caused by de-intercalation of inorganic particles of a porous coating layer including the inorganic particles, and having improved bonding force with an electrode. These and other objects and advantages of the present disclosure may be understood from the following detailed description and will become more fully apparent from the embodiments of the present disclosure. Also, it will be easily understood that the objects and advantages of the present disclosure may be realized by the means or methods described in the appended claims and combinations thereof.

Technical Solution

The present disclosure provides a composite separator for an electrochemical element, in order to resolve the aforementioned tasks.

A first aspect of the present disclosure relates to the composite separator, that may include a porous polymeric material; and a porous coating layer formed on at least one side surface of the porous polymeric material, wherein the composite separator includes an electrode bonding layer formed on both surfaces or on at least one surface of outermost surfaces thereof, the porous coating layer includes inorganic particles and binder resin, an entirety or portion of a surface of the inorganic particles being coated with the binder resin, and thus the particles are integrated by point binding and/or plane binding between the inorganic particles and stratified, the porous coating layer has a porous structure formed by interstitial volume between the inorganic particles, and the electrode bonding layer includes a particulate polymer having adhesive characteristics.

In a second aspect of the present disclosure, according to the first aspect of the present disclosure, glass transition temperature of the particulate polymer may be −110° C. to 0° C.

In a third aspect of the present disclosure, according to the first or second aspect of the present disclosure, a melting temperature of the particulate polymer may be 20° C. to 150° C.

In a fourth aspect of the present disclosure, according to any one of the first to third aspects of the present disclosure, the particulate polymer may include a homopolymer of vinylidene fluoride monomer and/or a copolymer of a vinylidene fluoride monomer and a co-monomer.

In a fifth aspect of the present disclosure, according to the fourth aspect of the present disclosure, the copolymer resin may be a copolymer of (a) vinylidene fluoride monomer and (b) one or more co-monomer selected from a group consisting of vinyl fluoride; trifluoroethylene (VF3); chlorotrifluoroethylene (CTFE); 1,2-difluoroethylene; tetrafluoroethylene (TFE); hexafluoropropylene (HFP); perfluoro(alkyl vinyl)ether such as perfluoro(methyl vinyl)ether (PMVE), perfluoro(ethyl vinyl)ether (PEVE) and perfluoro(propyl vinyl)ether (PPVE); perfluoro(1,3-dioxole); and perfluoro(2,2-dimethyl-1,3-dioxole) (PDD).

In a sixth aspect of the present disclosure, according to the fourth aspect of the present disclosure, the vinylidene fluoride copolymer may include a vinylidene fluoride monomer in the range of 70 parts by weight to 97 parts by weight with a weight ratio.

In a seventh aspect of the present disclosure according to any one of the first to fifth aspects of the present disclosure, the bonding layer may include a particulate polymer including methacrylate-based polymer.

In an eighth aspect of the present disclosure, according to any one of the first to seventh aspects of the present disclosure, the binder resin is an organic solvent-soluble binder.

In a ninth aspect of the present disclosure, according to any one of the first to eighth aspects of the present disclosure, the inorganic particle may not occur oxidation and/or reduction reaction at an operating voltage range of 0 to 5 $V(Li/Li^+)$ of the electrochemical element.

In a tenth aspect of the present disclosure, according to the ninth aspect of the present disclosure, the inorganic particle may include the inorganic particle having ion transfer capabilities and/or a high dielectricity inorganic particle having a dielectric constant of 5 or above.

In an eleventh aspect of the present disclosure, according to the eighth aspect of the present disclosure, the binder resin may be prepared from an organic solvent as a solvent, and the particulate polymer may be prepared from a water-borne solvent as a disperse medium.

Further, the present disclosure relates to a preparation method for manufacturing a composite separator having the characteristics according to any one of the first to eleventh aspects of the present disclosure. According to a twelfth aspect of the present disclosure, the manufacturing method may comprise applying a slurry including inorganic particles and binder resin in an organic solvent to a porous material and drying it to form a porous coating layer; and applying a composition for forming an electrode bonding layer containing a particulate polymer on the porous coating layer and drying it to form a bonding layer.

In a thirteenth aspect of the present disclosure, according to the twelfth aspect of the present disclosure, the organic solvent may be one or two or more types of mixture selected from aliphatic hydrocarbons, aromatic hydrocarbons, ketones, chlorine-based aliphatic hydrocarbons, esters, ethers, alcohols and amides.

In a fourteenth aspect of the present disclosure, according to the twelfth aspect of the present disclosure, the composition for forming the electrode bonding layer is prepared from emulsion or suspension, in which particulate polymer is dispersed in a water-borne solvent.

Further, in a fifteenth aspect of the present disclosure, according to the first to eleventh aspects of the present disclosure, the electrode bonding layer may be formed on an upper surface of the porous coating layer.

Further, in a sixteenth aspect of the present disclosure, according to any one of the first to eleventh aspects of the present disclosure, the electrode bonding layer may have a coating amount of the particulate polymer of 0.05 $g/m^2$ to 5 $g/m^2$.

Advantageous Effects

A composite separator according to the present disclosure has excellent bonding force between inorganic particles of the porous coating layer, thereby preventing de-intercalation of the inorganic particles. Further, since the bonding layer is made of a particulate polymer, not only does the composite separator including the bonding layer have a thin thickness, but also the bonding force with the electrode is high, leading to excellent adhesion between the electrode and the separator and low interfacial resistance. Further, since an ion conduction path is formed by the pores formed between the polymer particles, the interfacial resistance is low. Therefore, when the composite separator according to the present disclosure is applied to an electrochemical element such as a secondary battery and the like, the output and life characteristics are excellent.

DESCRIPTION OF DRAWINGS

The accompanying drawings illustrate preferred embodiments of the present disclosure and together with the foregoing disclosure, serve to provide further understanding of the technical spirit of the present disclosure, and thus, the present disclosure is not construed as being limited to the drawings. Meanwhile, shape, size, scale or ratio of elements in provided drawings may be exaggerated to emphasize clarity of explanation.

BEST MODE

Figure 1:
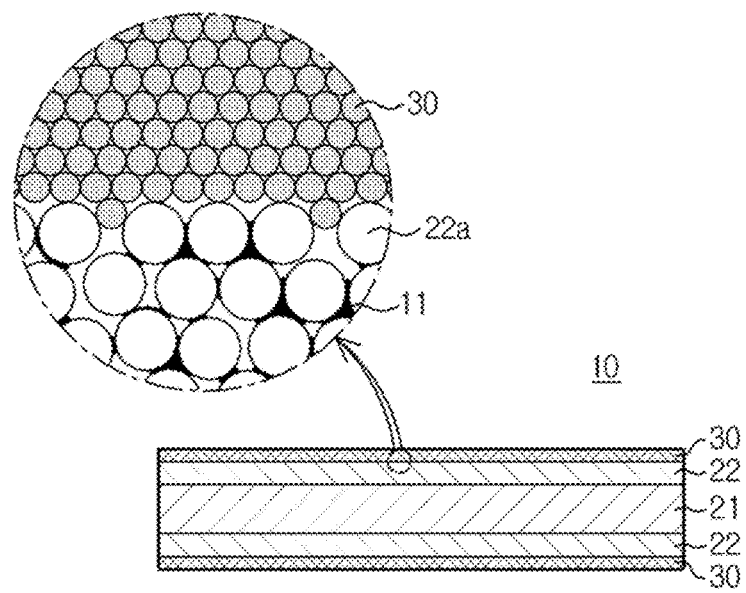
FIG. 1 schematically illustrates a cross-section of an electrode assembly including a composite separator according to the present disclosure.

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure. Therefore, the embodiments disclosed in the present specification and the configurations illustrated in the drawings are merely the most preferred embodiments of the present disclosure, and not all of them represent the technical ideas of the present disclosure, and thus it should be understood that there may be various equivalents and modified examples that could substitute therefor at the time of filing the present application.

The present disclosure relates to a composite separator for an electrochemical element, the separator having an electrode bonding layer on a surface thereof. In the present disclosure, using a particulate polymer, the electrode bonding layer may be formed to have a thin thickness, and have excellent bonding force with the electrode. Further, since an ion conduction path is formed between the particles, the interfacial resistance between the electrode and the separator is low, thus exhibiting excellent output and service life characteristics.

A composite separator according to one aspect of the present disclosure is characterized to include a porous polymer material including a polymeric material, and to have an electrode bonding layer formed on a surface of the composite separator. The composite separator serves as a porous ion-conducting barrier that passes ions, while blocking electrical contact between a negative electrode and a positive electrode. In the present disclosure, the electrode bonding layer is formed to include the particulate polymer and such that the particulate polymer is uniformly distributed on a surface of the composite separator.

Further, according to a second aspect of the present disclosure, the composite separator may further have a porous coating layer including inorganic particles and binder resin on one side surface or both side surfaces of a porous material, and in such a case where the porous coating layer is formed, the bonding layer is formed on a surface of the porous coating layer. In the second aspect of the present disclosure, the porous coating layer is formed by using an organic solvent as a dispersion medium for forming the porous coating layer, and as an entirety or portion of the surface of the inorganic particles are coated with the binder resin, the inorganic particles are bound to each other having the binder resin as their medium. The binding is point binding and/or plane binding. Further, the electrode bonding layer has, on a surface of the composite separator, the particulate polymer having adhesive characteristics uniformly distributed on a surface of the composite separator, or on a surface of a porous coating layer when the separator has the porous coating layer.

FIG. 1 schematically illustrates a composite separator 10 according to one embodiment aspect of the present disclosure. Referring to FIG. 1, the composite separator according to one embodiment aspect of the present disclosure includes a porous polymeric material 21, and on at least one side surface of the porous polymeric material, a porous coating layer 22 may be formed. The porous coating layer includes inorganic particles 22a and binder resin 11. Further, on at least one side surface of the composite separator, an electrode bonding layer 30 including particulate polymer 30a is formed, and preferably, the bonding layer is formed on a surface of the porous coating layer. The composite separator is interposed between a positive electrode and a negative electrode, and may be used as an ion conducting barrier of an electrochemical element.

Hereinafter, the present disclosure will be explained in detail, with respect to the configurative elements.

1. Porous Polymeric Material

According to one specific embodiment aspect of the present disclosure, the porous polymeric material provides lithium ions conduction path, while electrically insulating a negative electrode and a positive electrode to prevent short-circuit, and as long as it can be generally used as the material of a separator of an electrochemical element, it can be used without particular limitation. Such a porous material may be formed by at least one of polymeric resins such as, for example, polyolefin, polyethylene terephthalate, polybutylene terephthalate, polyacetal, polyamide, polycarbonate, polyimide, polyether ether ketone, polyethersulfone, polyphenylene oxide, polyphenylene sulfide, and polyethylene naphthalate, but there is no particular limitation thereto.

Further, as the porous polymeric material, either a sheet-like film formed by melting a polymeric resin and forming a film, or a nonwoven web formed by integrating filaments obtained by melt spinning a polymeric resin may be used. Preferably, it is a porous sheet-like material manufactured by melting/molding the polymeric resin.

Specifically, the porous polymeric material is one of the following a) to e).

a) a porous film formed by melting/extruding a polymeric resin b) a multilayered film where two or more layers of the porous film of a) are stacked c) a nonwoven web manufactured by integrating filaments obtained by melting/spinning a polymeric resin d) a multilayered film where two or more layers of the nonwoven web of b) are stacked e) a porous composite film of a multilayered structure including two or more of a) to d)

In the present disclosure, the thickness of the porous polymeric material may be suitably selected from a range of 5 to 50 μm. Although the range of the porous material is not particularly limited to the aforementioned range, if the thickness is too much thinner than the aforementioned lower limit, the mechanical property may deteriorate and the separator may be easily damaged during use of the battery. Meanwhile, although the size and porosity of the pores existing in the porous material are not particularly limited either, they may be 0.01 to 50 μm and 10 to 95%, respectively.

2. Porous Coating Layer

In one specific embodiment aspect of the present disclosure, the porous coating layer is stratified on one side surface or on both side surfaces of the polymeric material. The porous coating layer includes a mixture of a plurality of inorganic particles and binder resin, where the inorganic particles are integrated and laminated by virtue of the binder resin. That is, in the porous coating layer, an entirety or portion of the surface of the inorganic particles are coated with the binder resin so that the inorganic particles are point bound and/or plane bound to each other by virtue of the binder resin. Further, the porous coating layer is bonded to the porous material by virtue of the binder resin. As the surface of the porous polymeric material is coated with the porous coating layer including the inorganic particles as aforementioned, the thermal resistance and mechanical property of the composite separator are further improved.

The porous coating layer not only has a fine porous structure formed by interstitial volume between the inorganic particles but also serves as a kind of spacer capable of maintaining the physical form of the porous coating layer. The interstitial volume means a space being limited by adjacent inorganic particles substantially surface contacting each other. Further, since the inorganic particles are characterized that their physical characteristics do not generally change even at a temperature of 200° C. or above, by the resulting ceramic porous coating layer, the composite separator has excellent thermal resistance. In the present disclosure, the thickness of the porous coating layer is 1 μm to 50 μm, or 2 μm to 30 μm, or 2 μm to 20 μm.

In the porous coating layer, the content ratio of the inorganic particles and the binder resin is determined in consideration of the thickness, pore size and porosity of the porous coating layer of the present disclosure that is finally manufactured, but based on the weight ratio, the inorganic particles are comprised of 50 to 99.9 wt %, or 70 to 99.5 wt %, while the polymeric resin is comprised of 0.1 to 50 wt % or 0.5 to 30 wt %. If the content of the inorganic particles is less than 50 wt %, it means that the content of the polymeric resin is too high, reducing the pore size and porosity due to reduction of empty space being formed between the inorganic particles, thereby causing deterioration of final battery performance. On the other hand, if the content of the inorganic particles exceeds 99.9 wt %, it means that the content of the polymeric resin is too low, weakening the bonding force between the inorganic particles, thereby causing deterioration of the mechanical property of the final porous coating layer.

According to one specific embodiment aspect of the present disclosure, there is no limitation to the inorganic particles of the porous coating layer, but to form a coating layer of uniform thickness and a suitable porosity, it may be in the range of 0.001 to 10 μm if possible. If the size of the inorganic particle satisfies this range, dispersibility is maintained, and thus it is easy to adjust the property of the separator, and the increasing phenomenon of the thickness of the porous coating layer may be avoided, thereby improving the mechanical property, and due to the extremely large pore size, there is low possibility of generating internal short-circuit during charging and discharging of battery.

As long as the inorganic particles are electrochemically stable, there is no particular limitation. That is, as long as the inorganic particles are those that do not occur oxidation and/or reduction reaction at an operating voltage range (for example, 0 to 5 V on the basis of Li/Li$^+$) of the electrochemical element being applied, there is no particular limitation. Specifically, in the case of using inorganic particles having ion transfer capability, it is possible to increase the ion conductivity inside the electrochemical element to promote improvement of performance. Further, using inorganic particles having high dielectricity may contribute to increase of electrolyte salt in a liquid electrolyte, for example, the dissociation degree of lithium salt, and improve the ion conductivity of the electrolyte.

Due to the aforementioned reasons, examples of the inorganic particles that may be used include inorganic particles having high dielectricity of a dielectric constant of 5 or above, or 10 or above, inorganic particles having lithium ion transfer capabilities or a mixture thereof. Non-limiting examples of the inorganic particles having a dielectric constant of 5 or above include $BaTiO_3$, $Pb(Zr,Ti)O_3$ (PZT), $Pb1-xLaxZr1-yTiyO_3$ (PLZT, wherein $0<x<1$, $0<y<1$), $Pb(Mg_{1/3}Nb_{2/3})O_3$—$PbTiO_3$ (PMN-PT), Hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$ and the like, and the inorganic particles may be used alone, or as a mixture of two or more thereof. Further, when combining the aforementioned inorganic particles of high dielectricity and inorganic particles having lithium ion transfer capabilities, their increase effect can be doubled.

Non-limiting examples of the inorganic particles having the lithium ion transfer capabilities include $(LiAlTiP)_xO_y$ type glass ($0<x<4$, $0<y<13$) such as lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), and $14Li_2O$-$9Al_2O_3$-$38TiO_2$-$39P_2O_5$, lithium germanium thiophosphate ($Li_xGe_yP_zS_w$, $0<x<4$, $0<y<1$, $0<z<1$, $0<w<5$) such as lithium lanthan titanate ($Li_xLa_yTiO_3$, $0<x<2$, $0<y<3$), and $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as LiI—$Li_2S$—$P_2S_5$, or a mixture thereof.

The binder resin being included in the porous coating layer is soluble in an organic solvent, but preferably, a polymeric resin having a glass transition temperature (Tg) that is as low as possible is used, the preferable range of the glass transition temperature being −200° C. to 200° C. This is because it may improve the mechanical property such as the flexibility and elasticity of the composite separator. The binder resin stably fixates the adhesion between the inorganic particles, thereby contributing to preventing deterioration of the mechanical property of the porous coating layer being finally manufactured. In the present disclosure, the binder resin need not have the ion conducting capability, but when using a polymeric resin having ion conducting capability, the performance of the electrochemical element may be further improved. Therefore, it is preferable that the binder resin has a dielectric constant that is as high as possible. Accordingly, a polymeric resin having a solubility index of 15 to 45 MPa$^{1/2}$ is preferable, and more preferably, a solubility index of a range of 15 to 25 MPa$^{1/2}$ and 30 to 45 MPa$^{1/2}$. Therefore, it is preferable to use hydrophilic polymeric resins having numerous polar groups rather than hydrophobic polymeric resins such as polyolefins. If the solubility index is less than 15 MPa$^{1/2}$ or more than 45 MPa$^{1/2}$, it may be difficult to be immersed in a conventional liquid electrolyte for batteries.

In one specific embodiment aspect of the present disclosure, the binder resin includes a PVDF-based polymeric resin containing vinylidene fluoride (VDF) as a monomer. The PVDF-based polymeric resin may be a copolymer of VDF with one or more types of co-monomers selected from hexafluoropropylene (HFP) or chlorotrifluoroethylene (CTFE), hexafluoro isobutylene, perfluorobutyl ethylene, perfluoro(propyl vinyl)ether (PPVE), perfluoro(ethyl vinyl) ether (PEVE), perfluoro(methyl vinyl)ether (PMVE), perfluoro-2,2-dimethyl-1,3-dioxole (PDD) and perfluoro-2-methylene-4-methyl-1,3-dioxolane (PMD), and according to one specific embodiment aspect of the present disclosure, the co-monomer is hexfluoropropylene (HFP) and/or chlorotrifluoroethylene (CTFE). If the content of the co-monomer is in the range of 5 to 50 wt %, based on an entirety of polyvinylidene fluoride (PVDF)-based copolymer, there is no particular limitation.

In the present disclosure, as a PVDF-based polymeric resin, a mixture of one or two or more types selected from a group consisting of polyvinylidene fluoride, polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-chlorotrifluoroethylene and polyvinylidene fluoride-co-ethylene may be used.

Meanwhile, in one specific embodiment aspect of the present disclosure, the binder resin may further include one or two or more polymeric resins selected from a group consisting of poly(methyl methacrylate), poly(butyl acrylate), polyacrylonitrile, polyvinylpyrrolidone, polyvinyl acetate, polyethylene-co-vinyl acetate, polyethylene oxide, polyarylate, cyanoethyl pullulan, cyanoethyl polyvinyl alcohol, cyanoethyl cellulose, cyanoethyl sucrose, pullulan and carboxymethyl cellulose.

Meanwhile, the pore size and porosity of the porous coating layer mainly depend on the size of the inorganic particles, and for example, when a inorganic particle having a diameter of 1 μm or below is used, the pore being formed is also 1 μm or below. Such a pore structure is later filled with electrolyte to be injected, and the electrolyte filled in such a way plays the role of ion transfer. Therefore, the pore size and porosity are important factors in adjusting the ion conductivity of the porous inorganic coating layer. It is preferable that the pore size and porosity of the porous inorganic coating layer of the present disclosure are in the ranges of 0.001 to 10 μm, and 5 to 95%, respectively.

3. Method for Manufacturing Porous Coating Layer

In one specific embodiment aspect of the present disclosure, the porous coating layer is formed by mixing the aforementioned inorganic particles and binder resin in a solvent to prepare a slurry for a porous coating layer, and then applying the resulting slurry on a porous material and drying it.

In the present disclosure, the solvent is an organic solvent, and as long as it can uniformly disperse the inorganic particles and binder resin, there is no particular limitation thereto.

The organic solvent may be of cyclic aliphatic hydrocarbons such as cyclopentane and cyclohexane; aromatic hydrocarbons such as toluene, xylene and ethylbenzene; ketones such as acetone, ethyl methyl ketone, diisopropyl ketone, cyclohexanone, methylcyclohexane and ethylcyclohexane; chlorine-based aliphatic hydrocarbons such as methylene chloride, chloroform and carbon tetrachloride; esters such as ethyl acetate, butyl acetate, γ-butyrolactone and ε-caprolactone; acrylonitriles such as acetonitrile and propionitrile; ethers such as tetrahydrofuran and ethylene glycol diethyl ether; alcohols such as methanol, ethanol, isopropanol, ethylene glycol and ethylene glycol monomethyl ether; and amides such as N-methylpyrrolidone and N,N-dimethylformamide, and according to one specific embodiment aspect of the present disclosure, the solvent may include acetone in consideration of advantages of the drying process.

Said solvents may be used alone, or a mixed solvent where two or more thereof are mixed may be used. Of these, it is preferable to use a solvent with low boiling point and high volatility, since such a solvent can also be removed at low temperature in a short period of time. Specifically, it is preferable that the solvent is acetone, toluene, cyclohexane, cyclopentane, tetrahydrofuran, cyclohexane, xylene, or N-methylpyrrolidone, or a mixture thereof.

It is preferable that the content ratio of the inorganic particles and binder in the slurry is the aforementioned ratio with respect to the porous coating layer.

There is no limitation to the method for applying the slurry on the porous material to form the porous coating layer, and examples of the methods include dip coating method, die coating method, roll coating method, comma coating method, doctor blade coating method, reverse roll coating method and direct roll coating method.

4. Electrode Bonding Layer

The electrode bonding layer is formed on a surface of the composite separator to play a role of providing a firm adhesion force of the composite separator and the electrode. FIG. 1 illustrates the composite separator having a bonding layer, and accordingly, the electrode bonding layer is formed on both surfaces of the composite separator. In the present disclosure, the electrode bonding layer includes a plurality of particulate polymers, and said polymers have adhesive characteristics, and by the mutual bonding between the particles, the particles are integrated to form an electrode bonding layer of a laminated structure on the surface of the separator.

In the present invention, the particulate polymers may be changed into gel or liquid state, while heat and/or pressure is being applied, and that may be changed into a solid state again after the heat and pressure are removed, and that are electrochemically stable as well. In one specific embodiment aspect of the present disclosure, the particulate polymers have a glass transition temperature (Tg) in the range of about −100° C. to about 0° C., and a melting temperature (Tm) in the range of about 20° C. to about 150° C.

If Tg of the particulate polymer satisfies the aforementioned range, it is possible to achieve a certain bonding force, but if Tg exceeds the aforementioned range, especially at room temperature or above, the ion conductivity may deteriorate.

According to one specific embodiment aspect of the present disclosure, the particulate polymer includes polyvinylidene fluoride-based polymer (PVdF-based polymer). In the present disclosure, the PVdF-based polymer may include a single polymerization polymeric resin (homopolymer) of vinylidene fluoride monomer and/or a copolymer resin (co-polymer) including another co-monomer value. According to one specific embodiment aspect of the present disclosure, in consideration of the electrode bonding force of the bonding layer, the particulate polymer may include a copolymer resin. Further, PVdF copolymer resin may be a copolymerized polymer, including vinylidene fluoride and co-monomer in the ratio of 70:30 to 96:4, or 80:20 to 96:4, or 90:10 to 97:3, based on parts by weight.

As the co-monomer, fluoridated monomer or chlorine-based monomer and the like may be used, but fluoridated monomer is preferable. Non-limiting examples of the fluorinated monomer may be one or more selected from a group consisting of polyvinyl fluoride; trifluoroethylene (VF3); chlorotrifluoroethylene (CTFE); 1,2-difluoroethylene; tetrafluoroethylene (TFE); hexafluoropropylene (HFP); perfluoro(alkyl vinyl)ether such as perfluoro(methyl vinyl)ether (PMVE), perfluoro(ethyl vinyl)ether (PEVE) and perfluoro(propyl vinyl)ether (PPVE); perfluoro(1,3-dioxole); and perfluoro(2,2-dimethyl-1,3-dioxole) (PDD), and according to one specific embodiment aspect of the present disclosure, the co-monomer includes hexafluoropropylene.

In the present disclosure, there is no particular limitation to the weight average molecular weight (Mw) of PVdF-based polymer, but preferable Mw is 10,000 to 500,000, and more preferable is 50,000 to 500,000.

Further, according to one specific embodiment aspect of the present disclosure, the bonding layer may include a particulate polymer including a methacrylate-based polymer. According to one specific embodiment aspect of the present disclosure, the methacrylate-based polymer contains methacrylic acid ester as a monomer, and the non-limiting examples thereof include methacrylate-based polymers including, as a monomer, butyl methacrylate, 2-ethylhexyl (meth)acrylate, ethyl methacrylate, methyl methacrylate, n-propyl methacrylate, i-propyl methacrylate, t-butyl methacrylate, pentyl methacrylate, n-oxyl methacrylate, i-octyl methacrylate, i-nonyl methacrylate, lauryl methacrylate, and tetradecyl methacrylate.

The methacrylate polymer may be included in a maximum range of 30 wt %, based on 100 wt % of the bonding layer.

In one specific embodiment aspect of the present disclosure, the particulate polymer has a diameter of 100 nm to 1 μm, 100 nm to 500 nm, or 200 nm to 500 nm, or 200 nm to 350 nm, or 200 nm to 300 nm.

In the present disclosure, the coating amount of the electrode bonding layer with respect to the surface of the porous coating layer is 0.05 g/m$^2$ to 5 g/m$^2$. If the coating amount of the electrode bonding layer is less than 0.05 g/m$^2$, there is too little binding ingredients included in the bonding layer, and thus is unable to exhibit the bonding force of a desirable level. On the other hand, if the electrode bonding layer exceeds the aforementioned range and becomes too thick, the ion conductivity of the separator deteriorates, causing a problem of increase in resistance depending on continuance of charging and discharging.

In the present disclosure, it is preferable that the thickness of the electrode bonding layer is 0.1 to 5 μm. If the thickness of the bonding layer exceeds the aforementioned range too much, the ion permeability deteriorates, thereby deteriorating the operating performance of the battery.

In the present disclosure, there is no particular limitation to the method for manufacturing the particulate polymer, and thus conventional methods for manufacturing the particulate polymer, such as solution polymerization, suspension polymerization, emulsion polymerization and the like may be applied. Of these methods, preferable methods are emulsion polymerization and suspension polymerization that are capable of polymerization in water and that may be used as compositions for forming a bonding layer.

5. Forming Electrode Bonding Layer

In the present disclosure, the bonding layer is formed by dispersing the aforementioned polymer particles having a suitable water-borne solvent as a disperse medium to prepare a composition for forming a bonding layer, and applying the composition on a surface of the separator, for example, on a surface of the porous coating layer, and drying it.

The composition may be prepared by mixing the particulate polymer with the water-borne solvent, or one resulted from suspension polymerization, liquid phase polymerization, and high molecular emulsion of emulsion polymerization and the like may be used. It is preferable that the water-borne solvent is an aqueous medium including water. By using the aqueous medium, the composition of the bonding layer has little negative effect on the environment, and the stability of the handing operator increases, and it is possible to make the bonding layer thinner.

The methods that may be used for applying the composition for forming a bonding layer include doctor blade coating method, dip coating method, reverse roll coating method, direct roll coating method, gravure coating method, extrusion coating method, brush coating method and the like, and the dip coating method and the gravure coating method are preferable in that they can uniformly control the thickness.

There is no particular limitation to the method for drying the composition, but for example, drying by wind such as warm air, hot air and low humidity air, and drying by radiation of (far) infra-red ray or electron-ray and the like may be used.

In the present disclosure, as the electrode bonding layer has a structure where high molecular particles are dispersed between the separator and the electrode, there is no interruption to the ion conductivity between the electrode and the separator, and thus the resistance increase rate is low and service life characteristic is excellent.

6. Other Additives

In one specific embodiment aspect of the present disclosure, the bonding layer may further contain an additive if necessary. One of these additives may be, for example, a viscosity agent (thickeners). Since the electrode bonding layer regarding the present embodiment contains the viscosity agent, the applicability of the electrode bonding layer or the charging and discharging characteristics of the electrochemical element may be further improved.

Examples of the viscosity agent may include, for example, cellulose compounds such as carboxymethyl cellulose, methylcellulose and hydroxypropyl cellulose; ammonium salt or alkali metal salt of the cellulose compound; polycarboxylic acid such as poly(methacrylic acid) and modified poly(methacrylic acid); alkali metal salt of the polycarboxylic acid; polyvinyl alcohol-based (co)polymer such as polyvinyl alcohol, modified polyvinyl alcohol, and ethylene-vinyl alcohol copolymer and the like; water-soluble polymer such as a saponified material of a copolymer of unsaturated carboxylic acids such as methacrylic acid, maleic acid and fumaric acid, and vinyl ester. Of these, especially preferable viscosity agents are alkali metal salt of carboxymethyl cellulose and alkali metal salt of poly(methacrylic acid) and the like.

In the case where the composition of the electrode bonding layer regarding the present embodiment contains a viscosity agent, the ratio of use of the viscosity agent is preferably 5 mass % or below, and more preferably, 0.1 to 3 mass % regarding the total solid amount of the composition.

The composite separator of the present disclosure manufactured as aforementioned may be used as a separator of the electrochemical element. Examples of the electrochemical element includes any element that reacts electrochemically, that is, all types of primary and secondary batteries, fuel cells, solar cells or capacitors and the like. Especially, of the secondary batteries, lithium secondary batteries including lithium metal secondary batteries, lithium ion secondary batteries, lithium polymer secondary batteries, or lithium ion polymer secondary batteries and the like are preferable.

In one specific embodiment aspect of the present disclosure, the lithium secondary batteries may be manufactured by a conventional method known in the related technical field. According to one embodiment aspect of the present disclosure, by interposing the aforementioned separator between a positive electrode and a negative electrode to prepare an electrode assembly, and then inserting it in a battery case and then injecting an electrolyte thereto, a secondary may be manufactured.

In one embodiment aspect of the present disclosure, an electrode 40 of the secondary battery may be manufactured in a form where an electrode active material 41 is bonded to an electrode current collector 42 according to a conventional method known in the related art. Of the electrode active materials, non-limiting examples of the positive active material that may be used include general positive active materials that may be used in a positive electrode of a conventional electrochemical element, and especially, lithium intercalation materials such as lithium manganese oxide, lithium cobalt oxide, lithium nickel oxide, lithium iron oxide, or a mixture thereof are preferable. Non-limiting examples of the negative active material that may be used include general negative active materials that may be used in a negative electrode of a conventional electrochemical element, and especially, lithium intercalation materials such as lithium metal or lithium alloy, carbon, petroleum coke, activated carbon, graphite or other carbonaceous materials and the like are preferable. Non-limiting examples of the positive electrode current collector include a foil manufactured by aluminum, nickel or a mixture thereof, and non-limiting examples of the negative current collector include a foil manufactured by copper, gold, nickel, copper alloy, or a mixture thereof.

The electrolyte that may be used in the present disclosure is a salt of a structure of $A^+B^-$ and the like, wherein $A^+$ includes ions consisting of alkali metal cations such as $Li^+$, $Na^+$, $K^+$, or a mixture thereof, and $B^-$ includes ions consisting of anions such as $PF_6^-$, $BF_4^-$, $Cl^-$, $Br^-$, $I^-$, $ClO_4^-$, $AsF_6^-$, $CH_3CO_2^-$, $CF_3SO_3^-$, $NCF_3SO_2)_2^-$, $CCF_2SO_2)_3^-$, and a mixture thereof, for example, the salt dissolved or dissociated in organic solvents consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof, but there is no limitation thereto.

Injection of the electrolyte may be performed at a suitable step of the battery preparation process according to the manufacturing process and required properties of the final product. That is, it may be applied prior to assembling the battery or at the final step of assembling the battery. The processes that may be used to apply the electrode assembly to the battery include lamination and stacking of the separator and electrode and a folding process, besides winding, that is a conventional process.

Hereinafter, for more specific description, the present disclosure will be described in detail with reference to Examples. However, the Examples according to the present disclosure can be modified in various forms, and the scope of the present disclosure is not to be construed as being limited to the Examples described below. The Examples according to the present disclosure are provided in order to give more complete description of the present disclosure to those having average knowledge in the art.

EXAMPLE

Example 1

Acetone, alumina (average diameter: 500 nm, product of Sumitomo), polyvinylidene fluoride-hexafluoropropylene (containing 4 wt % of hexafluoropropylene, Tm: 140° C.), and dispersant (Cyano resin, product of ShinEtsu) were mixed with a weight ratio of 80:18:1.7:0.3 to prepare a slurry for forming a porous coating layer. The resulting slurry as aforementioned was coated on a porous material made of polyethylene/polypropylene/polyethylene to have a size of 10 $cm^2$ in four directions by the dip coating method, and then dried to obtain a separator material. Here, the coating thickness of the porous coating layer was adjusted to about 1 μm based on cross-section. Next, PVdF-HFP (containing 4 wt % of HPF, Tm: 140° C., Tg: −50° C.) and poly(butyl acrylate) (Kpx130, Tg: −20° C., diameter 200 nm, product of Toyo) were put into water with a ratio of 80:20 (by wt %), and then stirred to prepare a uniform dispersed solution. Here, the concentration of solid matter in the dispersed solution was adjusted to 5%. The dispersed solution was coated on the separator material in the dip coating method, and then dried to obtain a composite separator, where an electrode bonding layer was formed. In the bonding layer, the coating amount of the fluoride-hexafluoropropylene and methacrylate-based polymer was 1 $g/m^2$, and the thickness of the bonding layer was about 1 μm, based on cross-section.

Comparative Example 1

Acetone, alumina (average diameter: 500 nm, product of Sumitomo), polyvinylidene fluoride-hexafluoropropylene (containing 4 wt % of hexafluoropropylene), and dispersant (Cyano resin, product of ShinEtsu) were mixed with a weight ratio of 80:18:1.7:0.3 to prepare a slurry for forming a porous coating layer. The resulting slurry as aforementioned was coated on a porous material made of polyethylene/polypropylene/polyethylene to have a size of 10 $cm^2$ in four directions in the dip coating method. Here, the coating amount of the slurry was adjusted to 8~12 $g/m^2$. By maintaining the humidity in a dry oven at 40% or above, phase separation by water was induced to obtain a composite separator, where polyvinylidene fluoride-hexafluoropropylene is omnipresent on the surface side.

Comparative Example 2

Water, poly(butyl acrylate) (Tg: −20° C., average diameter: 200 nm, product of Toyo), alumina (average diameter: 500 nm, product of Sumitomo) and a dispersant (CMC) were mixed by a weight ratio of 85:14.5:0.25:0.25 to manufacture a slurry for forming a porous coating layer. The slurry manufactured as aforementioned was coated on a porous material made of polyethylene/polypropylene/polyethylene to have a size of 10 $cm^2$ in four directions in the dip coating method. Here, the coating thickness of the porous coating layer was adjusted to about 1 μm, based on cross-section. Next, fluoride-hexafluoropropylene (containing 4 wt % of HPF, Tm: 140° C., Tg: −50° C.) and poly(butyl acrylate) (Tg: −20° C., average diameter: 200 nm, product of Toyo) were put into water with a ratio of 80:20 (by wt %), and then stirred to prepare a uniform dispersed solution. Here, the concentration of solid matter in the dispersed solution was adjusted to 5%. By coating the dispersed solution on the separator material in the dip coating method and then drying it, a composite separator, where an electrode bonding layer was formed, was obtained, and the coating amount of the fluoride-hexafluoropropylene and poly(butyl acrylate) in the bonding layer was 1 $g/m^2$, and the thickness of the bonding layer was about 1 μm, based on cross-section.

Comparative Example 3

Acetone, alumina (average diameter: 500 nm, product of Sumitomo), polyvinylidene fluoride-hexafluoropropylene (containing 4 wt % of hexafluoropropylene), and dispersant (Cyano resin, product of ShinEtsu) were mixed with a weight ratio of 80:18:1.7:0.3 to prepare a slurry for forming a porous coating layer. The resulting slurry as aforementioned was coated on a porous material made of polyethylene/polypropylene/polyethylene to have a size of 10 $cm^2$ in four directions in the dip coating method, and then dried with hot air. Here, the coating thickness of the porous coating layer was adjusted to about 1 μm, based on cross-section. Next, fluoride-hexafluoropropylene (containing 4 wt % of HPF, Tm: 140° C., Tg: −20° C.) and poly(butyl acrylate) (Tg: 60° C., average diameter: 200 nm, product of Toyo) were put into water with a ratio of 80:20 (by wt %), and then stirred to prepare a uniform dispersed solution. Here, the concentration of solid matter in the dispersed solution was adjusted to 5%. By coating the dispersed solution on the separator material in the dip coating method and then drying it, a composite separator, where an electrode bonding layer was formed, was obtained, and the coating amount of the fluoride-hexafluoropropylene and poly(butyl acrylate) in the bonding layer was 1 $g/m^2$, and the thickness of the bonding layer was about 1 μm, based on cross-section

Comparative Example 4

Acetone, alumina (average diameter: 500 nm, product of Sumitomo), polyvinylidene fluoride-hexafluoropropylene (containing 4 wt % of hexafluoropropylene), and dispersant (Cyano resin, product of ShinEtsu) were mixed with a weight ratio of 80:18:1.7:0.3 to prepare a slurry for forming a porous coating layer. The resulting slurry as aforementioned was coated on a porous material made of polyethylene/polypropylene/polyethylene to have a size of 10 $cm^2$ in four directions in the dip coating method, and then dried with hot air to form a porous coating layer. Here, the coating thickness of the porous coating layer was adjusted to about 1 μm, based on cross-section. Next, polyvinylidene fluoride-hexafluoropropylene (containing 15 wt % of hexafluoropropylene) was mixed in acetone in a solid matter concentration of 20% to prepare a high molecular solution. Thereafter, the high molecular solution was applied on the surface of the porous coating layer using a slot die, and then dried to form a bonding layer. The thickness of the bonding layer was 1 μm, based on cross-section. Next, polyvinylidene fluoride-hexafluoropropylene (containing 15 wt % of hexafluoropropylene) was mixed in acetone in a solid matter concentration of 20% to manufacture a high molecular solution. Thereafter, the high molecular solution was applied on the surface of the porous coating layer using a slot die and then dried to form a bonding layer. The thickness of the bonding layer was 1 μm based on cross-section.

Experiment Results

For measuring the thickness of the porous coating layer and the bonding layer in the composite separator, a device for physically measuring the actual thickness was used. Of evaluations on the bonding force, the evaluation on the bonding force of the inorganic particles was obtained by placing a 3M double-sided tape on top of a slide glass, and then attaching the composite separator obtained from each of the aforementioned Examples and comparative Examples, and then recording the force being measured, while peeling off the separator from the double-sided tape using a UTM (a device for measuring tensile strength). On the separator, the double-sided tape and the bonding layer were attached to face each other. The evaluation on the electrode bonding force was obtained by placing the active material layer surface of the negative electrode and the separator bonding layer to face each other, and then lamination was performed in hot pressure using a roll laminator heated to 70° C. to 90° C., and then recording the force being measured while peeling off the negative electrode and the separator from the UTM device. The bonding force of the inorganic particles is a value that reflects the bonding force between the inorganic particles and the bonding force and the inorganic particles and the separator material, and the electrode bonding force is a value reflecting the level of bonding force between the electrode and the coated separator.

Meanwhile, in order to confirm the electrode bonding layer, an electrode (negative electrode) was manufactured in the following method. Conductive carbon (Super P) was put into a composition where graphite and SBR binder were mixed and then dispersed in water to prepare a slurry. Here, the content ratio of graphite:binder (SBR):conductive carbon (Super-P) was a weight ratio of 98.6:1:0.4. This slurry was coated on a copper foil, sufficiently dried at 130° C., and then pressed to prepare a negative electrode. The thickness of the negative electrode was about 135 μm.

Figure 2:
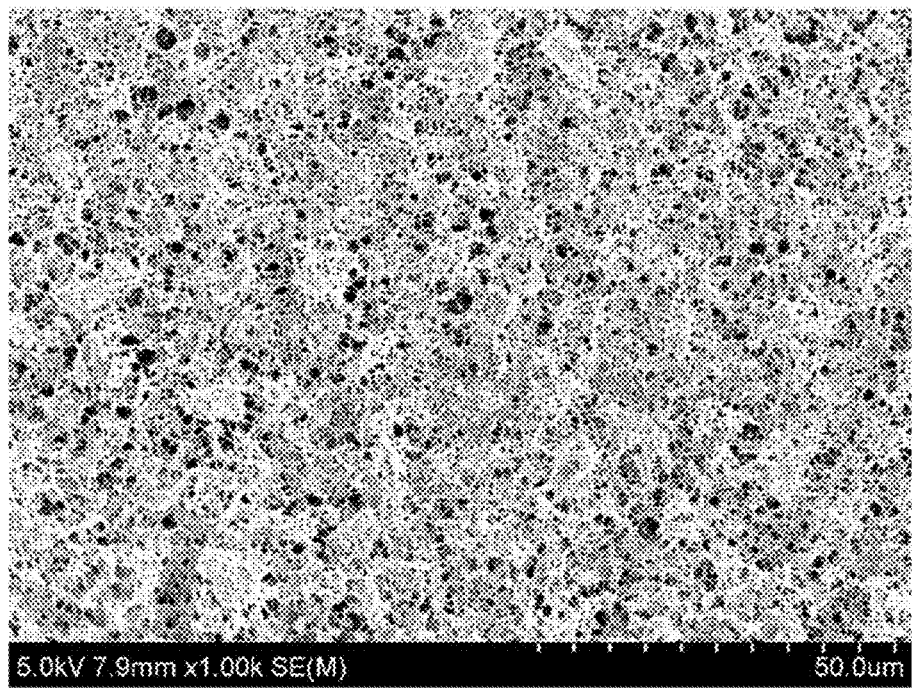
FIG. 2 is an SEM photograph of a surface of a porous coating layer manufactured in Comparative Example 4.

The comparative Example 1 is a case where a bonding layer is formed on a surface of the porous coating layer by humidification phase separation, and since the porous coating layer and the bonding layer are formed to be thick, consequently the thickness of the separator becomes thick, which is not preferable. In the comparative Example 2, a sufficient bonding force was not formed between the inorganic particles, and thus the bonding force of the inorganic particles appeared to be low, and further, the electrode bonding force was also low. In the case of comparative Example 3, it was confirmed that the bonding force of the inorganic particles is excellent, but the electrode bonding force is low. In the case of comparative Example 4, not only was the electrode bonding force low, but also, conglomerating phenomenon of the binder occurred during drying of the porous coating layer, and thus the thickness deviation was not uniform (see FIG. 2). On the other hand, in the composite separator obtained from Example 1, the thickness of the porous coating layer and the bonding layer formed was thin. Further, the bonding layer was formed on the surface of the porous coating layer to have a low and uniform thickness deviation. Experiment result data of Example 1 and comparative Examples 1 to 4 were sorted and listed in Table 1.

TABLE 1

| | Coating thickness (total sum of thickness of porous coating layer and bonding layer, based on cross-section) | Bonding force of inorganic particles (Peel_gf/15 mm) | Electrode bonding force (lami_gf/15 mm) |
|---|---|---|---|
| Example 1 | 4 μm | 30 gf | 50 gf |
| comparative Example 1 | 5 μm | 20 gf | 15 gf |
| comparative Example 2 | 4 μm | 5 gf | 30 gf |
| comparative Example 3 | 4 μm | 30 gf | 30 gf |
| comparative Example 4 | 5 μm | 30 gf | 15 gf |

REFERENCE NUMERALS

10 . . . composite separator
21 . . . porous polymer material
22 . . . porous coating layer, 22a . . . inorganic particles
30 . . . bonding layer, 30a . . . particulate polymer
11 . . . binder resin

What is claimed is:

1. A composite separator for electrochemical element, the separator comprising:
    a porous polymeric material; and
    a porous coating layer formed on at least one side surface of the porous polymeric material,
    wherein the composite separator includes an electrode bonding layer formed on both surfaces or on at least one surface of outermost surfaces thereof,
    the porous coating layer includes inorganic particles and binder resin, an entirety or portion of a surface of the inorganic particles being coated with the binder resin, and thus the particles are laminated by point binding and/or plane binding between the inorganic particles and stratified,
    the porous coating layer has a porous structure formed by interstitial volume between the inorganic particles, and
    the electrode bonding layer includes a particulate polymer having adhesive characteristics, and glass transition temperature of the particulate polymer is −110° C. to 0° C.,
    wherein a melting temperature of the particulate polymer is 20° C. to 150° C.,
    wherein the particulate polymer includes a homopolymer of vinylidene fluoride monomer and/or a copolymer of vinylidene fluoride monomer and a co-monomer,
    wherein the copolymer is a copolymer resin of (a) vinylidene fluoride monomer and (b) one or more co-monomers selected from a group consisting of vinyl fluoride; trifluoroethylene (VF3); chlorotrifluoroethylene (CTFE); 1,2-difluoroethyl ene; tetrafluoroethylene (TFE); hexafluoropropylene (HFP); perfluoro(alkyl vinyl)ether; perfluoro(1,3-dioxole); and perfluoro(2,2-dimethyl-1,3-dioxole)(PDD), and
    wherein vinylidene fluoride copolymer comprises vinylidene fluoride monomer in the range of 70 parts by weight to 97 parts by weight with a weight ratio.

2. The composite separator of claim 1, wherein the bonding layer comprises the particulate polymer including methacrylate polymer.

3. The composite separator of claim 1, wherein the binder resin is an organic solvent-soluble binder.

4. The composite separator of claim 1, wherein the inorganic particle does not occur oxidation and/or reduction reaction at an operating voltage range of 0 to 5 V(Li/Li$^+$) of the electrochemical element.

5. The composite separator of claim 4, wherein the inorganic particle includes the inorganic particle having ion transfer capabilities and/or a high dielectricity inorganic particle having a dielectric constant of 5 or above.

6. The composite separator of claim 3, wherein the binder resin is prepared from an organic solvent as a solvent, and the particulate polymer is prepared from a water-borne solvent as a disperse medium.

7. A method for manufacturing a composite separator for electrochemical element according to claim 1, the method comprising:
applying a slurry including inorganic particles and binder resin of an organic solvent to a porous material and drying it to form a porous coating layer; and
applying a composition for forming an electrode bonding layer containing a particulate polymer on the porous coating layer and drying it to form a bonding layer, and
wherein the composition for forming the electrode bonding layer has a particulate polymer prepared from emulsion or suspension dispersed in a water-borne solvent.

8. The method of claim 7, wherein the organic solvent is one or two or more types of mixture selected from aliphatic hydrocarbons, aromatic hydrocarbons, ketones, chlorine-based aliphatic hydrocarbons, esters, ethers, alcohols and amides.

9. The composite separator of claim 1, wherein the electrode bonding layer is formed on an upper surface of the porous coating layer.

10. The composite separator of claim 1, wherein the electrode bonding layer has a coating amount of the particulate polymer of 0.05 g/m$^2$ to 5 g/m$^2$.

11. A composite separator for electrochemical element, the separator comprising:
a porous polymeric material; and
a porous coating layer formed on at least one side surface of the porous polymeric material,
wherein the composite separator includes an electrode bonding layer formed on both surfaces or on at least one surface of outermost surfaces thereof,
the porous coating layer includes inorganic particles and binder resin, an entirety or portion of a surface of the inorganic particles being coated with the binder resin, and thus the particles are laminated by point binding and/or plane binding between the inorganic particles and stratified,
the porous coating layer has a porous structure formed by interstitial volume between the inorganic particles, and
the electrode bonding layer consists of a particulate polymer having adhesive characteristics, and glass transition temperature of the particulate polymer is $-110°$ C. to $0°$ C.,
wherein the particulate polymer comprises:
polyvinylidene fluoride (PVDF) homopolymer having vinylidene fluoride (VDF) monomer and/or PVDF based copolymer having VDF monomer and co-monomer; and/or
PVDF homopolymer having VDF monomer and/or methacrylate-based polymer and PVDF based copolymer having VDF monomer and co-monomer; and
wherein the binder resin is prepared in an organic solvent, and the particulate polymer is prepared in an aqueous solvent as a dispersion media, and the binder resin is soluble in organic solvents, and
wherein the PVDF based copolymer and/or PVDF homopolymer having VDF monomer and co-monomer includes vinylidene fluoride and co-monomer in the ratio of 70:30 to 96:4 based on parts by weight.

* * * * *